United States Patent [19]

Reeves et al.

[11] Patent Number: 4,620,603
[45] Date of Patent: Nov. 4, 1986

[54] ARTICULATED TOW VEHICLE

[75] Inventors: Allen R. Reeves, Antioch, Tenn.;
Charles F. Carson, Greensboro, N.C.

[73] Assignee: Blue Bell, Inc., Greensboro, N.C.

[21] Appl. No.: 703,111

[22] Filed: Feb. 19, 1985

[51] Int. Cl.$^4$ ............................................. B62D 51/04
[52] U.S. Cl. .................... 180/19.1; 254/8 R; 280/46
[58] Field of Search ............... 180/19.1, 19.3, 14.1, 180/14.3, 13, 11, 12, 65.1, 68.5, 60, 216; 280/46, 43, 43.24; 254/2 R, 8 R, 133 R, DIG. 3

[56] References Cited

U.S. PATENT DOCUMENTS

| | | | |
|---|---|---|---|
| 2,962,105 | 11/1960 | Simbulan | 180/13 |
| 3,033,300 | 5/1962 | Vanderbeck | 180/19.1 X |
| 3,179,196 | 4/1965 | Richardson | 180/19.1 X |
| 3,199,621 | 8/1965 | Seaman | 180/11 |
| 3,298,705 | 1/1967 | Neaverson et al. | 280/46 |
| 3,662,989 | 5/1972 | Swinson | 280/46 X |
| 3,865,204 | 2/1975 | Bueckner, Jr. | 180/12 |
| 3,941,198 | 3/1976 | Kappas | 180/11 |

FOREIGN PATENT DOCUMENTS 371115 6/1973 U.S.S.R. ............................ 180/19.1

Primary Examiner—John J. Love
Assistant Examiner—Mitchell J. Hill
Attorney, Agent, or Firm—Charles R. Rhodes; Judith E. Garmon

[57] ABSTRACT

A wheeled skid jack is pivotally and releasably connected to a wheeled electric power pack in which the skid jack is provided with a lever handle to manipulate the skid jack into engagement with the skid or pallet using the skid jack wheels as a fulcrum. The wheeled electric power pack supplies current to a gear motor mounted on the skid jack. Electrical controls are provided for controlling the direction of displacement of the skid jack and power pack by driving the gear motor in the desired direction.

4 Claims, 5 Drawing Figures

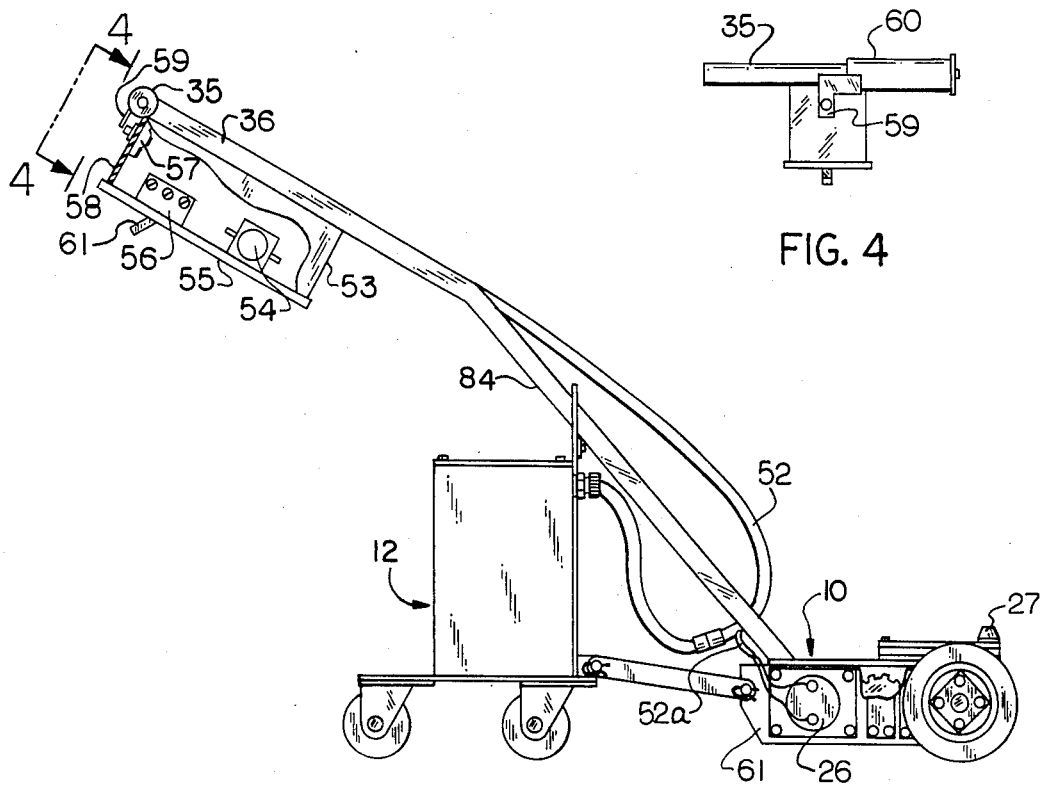
FIG. 4
FIG. 2
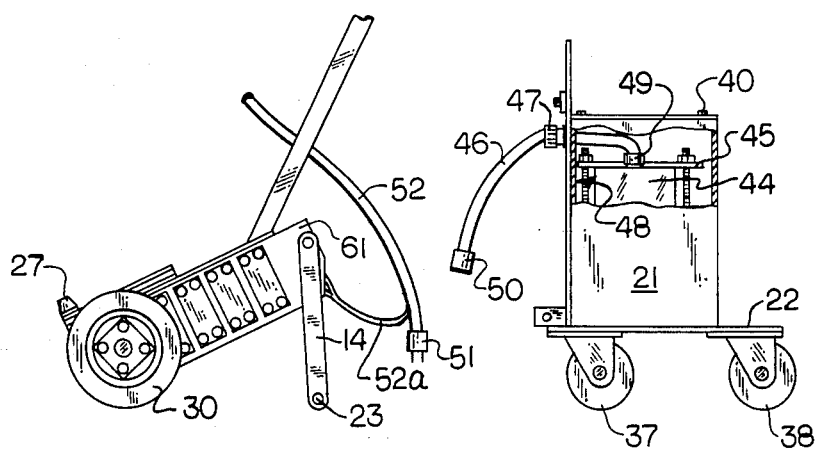
FIG. 3

ARTICULATED TOW VEHICLE

BACKGROUND AND SUMMARY OF THE PRESENT INVENTION

The present invention relates to an articulated tow vehicle having a separable power pack for moving wheeled skids.

Numerous devices have been employed for storing materials on skids and pallets in a plant or warehouse and moving the loaded skids or pallets with various hand operated towing devices and machine operated tow vehicles or forklift trucks. The utilization of forklift trucks in some warehouses is impractical and costly. The use of manual power to haul heavy loads has been impractical and injury prone in addition to exhaustion of laborers.

Numerous tow trucks for wheeled vehicles have been devised as reflected in U.S. Pat. Nos. 2,962,105; 3,033,300; 3,179,196; 3,298,705; 3,662,989; 3,865,204, among others. However, such tow trucks or wheeled pallets are, for the most part, costly, difficult to maintain and/or difficult to maneuver in relatively confined areas.

It is the principal object of the present invention to provide an improved electric skid jack assembly that is simple to operate, easy to maintain, and highly maneuverable in restricted or confined areas.

Another objective of the present invention is to provide an improved, articulated electric skid jack assembly in which a skid jack section is readily separable from a power pack section whereby the skid jack section may be powered by a second power pack section while the first power pack section is being recharged.

Another objective of the present invention is to provide a relatively compact electric skid jack assembly in which a skid jack portion is provided with a handle for guiding the skid jack when attached to a skid or pallel and one which is highly maneuverable even though attached to an electric power pack section.

The present invention provides an electric skid jack assembly in which a wheeled skid jack section is provided with an upwardly extending control handle and a housing in which the housing has a top mounted skid-engaging tongue with an electric motored gear drive mounted in the skid jack housing for driving the wheeled skid jack. A wheeled electric power pack provided with a storage battery is releasably connected to the rear end of the wheeled skid jack section with disengageable means for supplying electrical power from the power pack battery to the skid jack motor. The skid jack section is pivotally attached to the power pack by a linkage which allows tilting of the jack section into operative engagement with the skid to be moved without any attendant tilting or disturbing of the power pack section. Switch means is provided on the skid jack control handle for controlling the displacement of the skid jack and power pack for maneuvering the electric skid jack assembly to guide and maneuver a skid from one location to another.

Other objectives and many of the attendant advantages of this electric skid jack assembly will be more readily comprehended from the detailed description of the preferred embodiment and the accompanying drawings as well as the claims in which various modifications and equivalents are contemplated.

BRIEF DESCRIPTION OF THE DRAWINGS

FIG. 2 is an end elevational view of the electric skid jack of FIG. 1 with portions removed;

FIG. 3 is a partial end view of the skid jack disengaged from the power pack with portions removed;

FIG. 4 is a plan view of the handle controls taken along line 4—4 of FIG. 2.

DETAILED DESCRIPTION OF A PREFERRED EMBODIMENT

Figure 1:
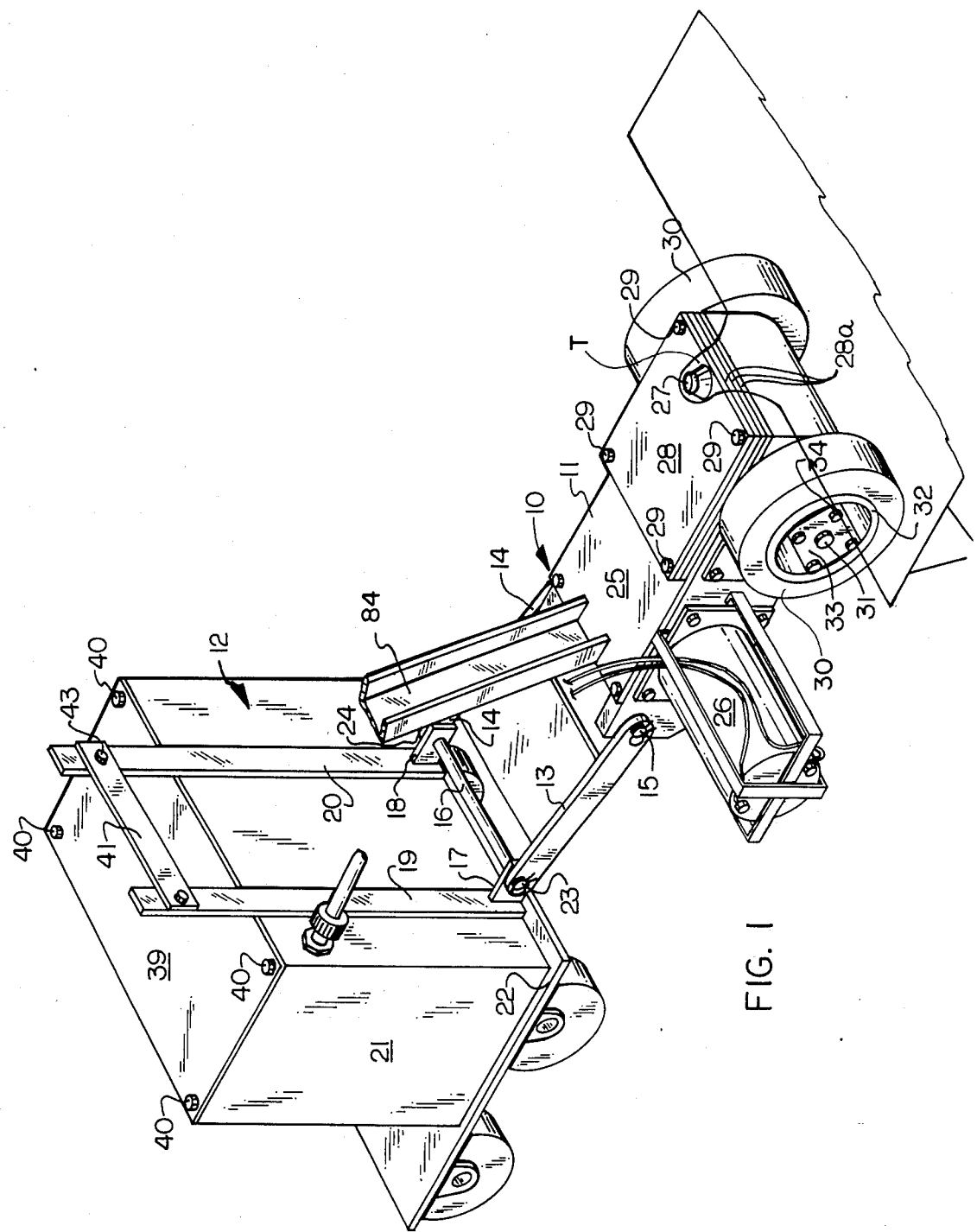
FIG. 1 is a partial perspective view of an electric skid jack with detachable power pack.

Referring to the drawings and particularly to FIGS. 1–3, there is illustrated an electric skid jack assembly 10 which includes a separable skid jack section 11 and a power pack battery section 12. The jack section 11 and power pack section 12 are releasably interconnected by the bar links 13 and 14 which are pivotally connected at one end to the skid jack section by pivot pins 15. Lugs 17 and 18 extend from the vertical bars 19 and 20 mounted to the power pack housing 21 supported on the frame base 22. A connecting bar 16 passes through the projecting lugs 17,18 and retains the opposite ends of bars 13 and 14 through the bar end openings 23 therein. Pin 15 and connecting bar 16 are retained in place by cotter pins. Removal of the bar 16 will quickly separate the skid jack 10 from the power pack section 12 as shown in FIG. 3 for attachment of a second power pack while the first is being recharged. Further, the pivotal connection of the skid jack to the power pack permits the relatively light jack alone to be tilted into engagement with the tongue of a skid to be moved while the relatively heavy power pack remains level or untilted even though still connected to the jack portion.

The skid jack housing 25 includes a gear train (not shown) which is driven by the motor 26 mounted to the side of the gear housing 25. A guard 26a protects the gear motor 26 during operation.

A skid tongue-engaging post 27 is mounted on the skid jack housing cover plate 28 which cover plate is secured by means of the screws 29 to cover the upper open portion of the housing 25 yet permits access to the gear train within the housing. Adjustment of the elevation of post 27 above the floor may be effected by adding one or more spaces or shims 28a beneath plate 28. The pair of wheels bearingly mounted on the shaft 31 is driven by the aforesaid gear train. Each of the tires 30 is preferably formed of neoprene or other suitable material and each is mounted on a cylindrical hub 32. Plate 33 is keyed to shaft 31 and lugs 34 on plate 33 whereby rotation of the shaft 32 by electric motor 26 through the gear train will rotate the tires 30 and rim 32.

An upwardly inclined U-shaped channel 84 is secured to housing cover plate 25 and extends upwardly to support the transverse handle 35 connected to the upper end 36 of the channel 84.

The skid jack section may be readily manipulated to engage the front opening in a tongue of a skid by means of the post 27 by suitably tilting or pivoting the front end of the skid jack into position under the front end of a skid thereby releasably locking post 27 into the opening of a skid tongue T. During this phase of the operation, the power pack section remains untilted, which makes the jack section being tilted much lighter. The wheels 30 act as a fulcrum for the channel lever 84 and handle 35 to raise the front end of a skid connected to the load-engaging post 27. Since the horizontal distance between the wheel axis and the post 27 is small relative to the length of the handle, extremely heavy loads may be easily lifted.

Links 13 and 14 facilitate pivotal displacement in the vertical direction of the rear section 61 of the skid jack section 11 relative to the power pack section 12. Thus, the skid jack section may be pivoted or tilted about wheels 30 by displacement of handle 35 through lever 84 without disturbing the power pack section 12. Further, because of the linkage 13,14, as the handle 84 is lifted to tilt the jack section 11, the power pack section 12 is caused to move forward out of the way thus allowing the operator better accessibility to the jack section.

The battery power pack section 12 is in the form of a dolly having pairs of front and rear casters 37 and 38 which are each rotatable about a vertical axis and supported to the base plate 22. The battery housing 21 is enclosed by the cover plate 39 which is secured to the top of housing 21 by means of the fastening lugs 40 at the corners of plate 39. A transverse support 41 is mounted at the upper ends of the vertical members 19 and 20 and fastened thereto by the bolts 43. Support 41 serves as a seat for U-shaped channel 84. An electric storage battery 44 is supported on the plate 22 within housing 21 as shown in FIG. 3, and a battery hold-down strap 45 fastens across the middle of the battery to releasably retain it in position within the housing 21. A suitable flexible insulated electrical cable suitably fastened by a connecting lug 47 fastened to side 48 of housing 21 will retain cable 46 in position with cable 46 being suitably connected to appropriate terminals 49 on battery 44 to supply current to the female plug 50 at the free end of cable 46. There is a male mating plug 51 at the free end of the flexible and insulated cable 52 which is attached to and extends from the electrical panel box 53 securely mounted to the web or backside of channel lever 34. A second cable 52a extends from panel box 53 to motor 26.

Solenoid 54 is mounted within the box 53 on the cover member 55. Toggle switch 56 is also mounted in box 53 on cover 55. A micro-switch 57 is mounted on the upper side of box 53 in close proximity to the microswitch engaging lug 59 that depends from a rotatable sleeve 60 mounted on the transverse handle 35.

Figure 5:
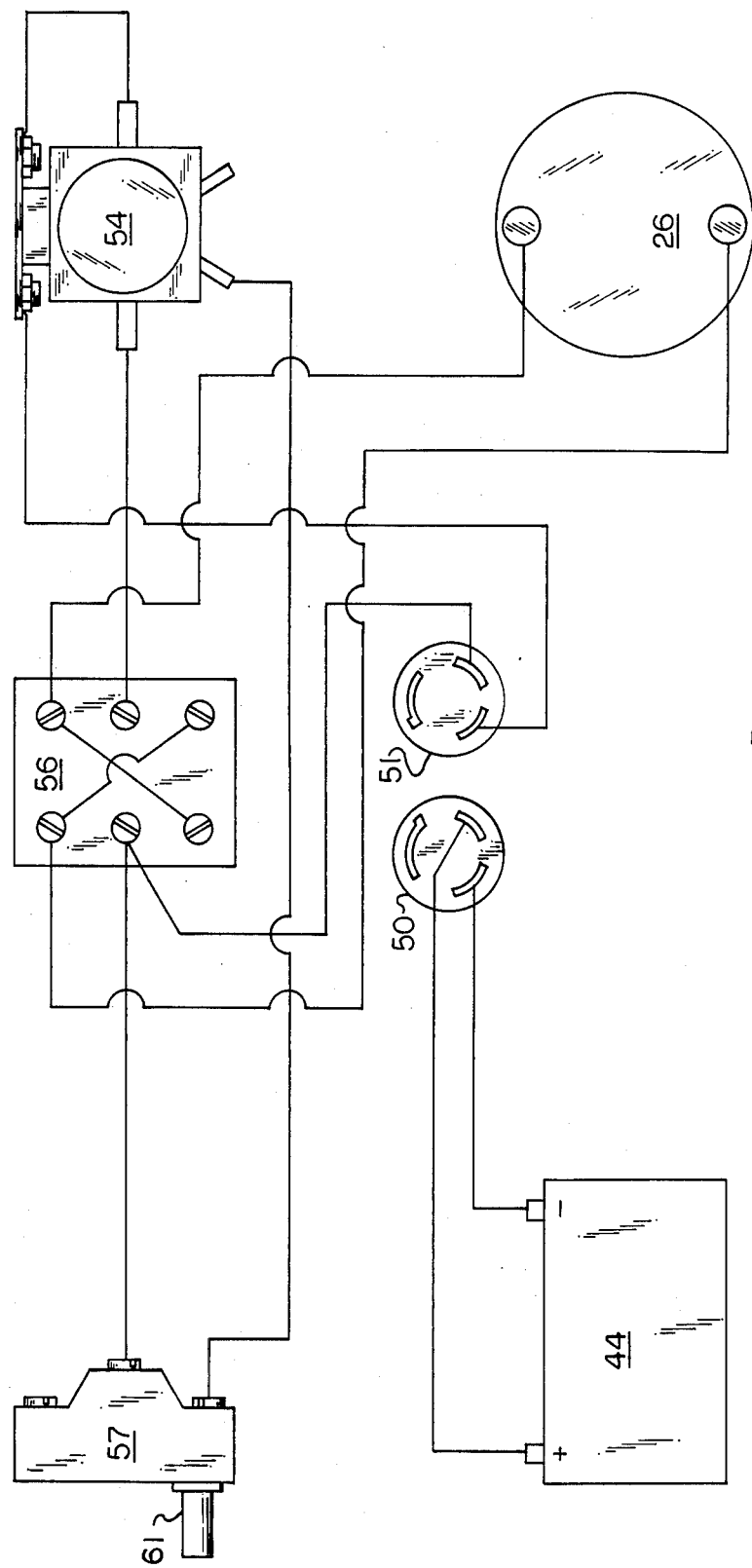
FIG. 5 is a schematic diagram of the electrical circuitry for the jack assembly and power pack unit.

The electrical schematic diagram in FIG. 5 illustrates the electrical system for operating the skid jack assembly when energized when the receptacles 51 are connected and the stop/go micro-switch 57 is engaged by the depending lug 59 upon rotation of sleeve 60 on handle 35. The forward and reverse switch 56 mounted in box 53 when switched to the forward or reversed position will, when connected through solenoid 54, control the direction of rotation of motor 26 permitting rotation of wheels 30 in a clockwise or counterclockwise direction for forward or reverse movement of the skid jack. Disengagement of the lug 59 with the spring-actuated plunger 61 of micro-switch 57 will de-energize the electrical system terminating displacement of the skid jack. It is readily comprehended that the housing for the skid jack section 11 and the housing 21 for the power pack section will be suitably insulated against the elements and also against short ciruiting.

What is claimed is:

1. An articulated tow vehicle for wheeled skids, pallets, and like material handling devices of the type which include a support platform supported by a pair of wheels at at least one end, the opposite end including a tongue having an aperture therein by means of which said tow vehicle may be selectively and releasably attached thereto to lift and tow said skid, said tow vehicle comprising:
   (a) a jack housing including:
      (i) a jack platform having a forward portion and a rear portion;
      (ii) a pair of spaced wheels fixedly attached to a shaft;
      (iii) said shaft rotatably mounted to said jack platform intermediate said forward portion and said rear portion whereby said wheels act as a fulcrum when said rear portion is lifted;
      (iv) a drive motor mounted on said jack platform in driving relation to said shaft whereby activation of said drive motor causes rotation of said shaft and wheels;
      (v) an upstanding locking post mounted on the upper side of said jack platform forwardly of the axis of said shaft for selective engagement with the aperture in said skid tongue, said engagement being effected by tilting the rear portion of said jack platform until said locking post is lowered and can be inserted into the skid tongue, then lowering said rear portion;
      (vi) a handle lever extending rearwardly and upwardly from the rear portion of said jack platform rearwardly of the axis of said shaft for effective said tilting movement;
   (b) a power pack platform supported by a plurality of wheels whereby said power pack is independently supported separate of said jack platform, an electrical power source mounted on said power pack platform and electrically connected to said drive motor;
   (c) a link means pivotally connecting, at each end thereof about a horizontal axis, the rear portion of said jack platform to the power pack platform, whereby tilting of the rear edge portion of said jack platform causes a resulting forward movement of said power pack platform and may be accomplished without lifting and tilting said electrical power source.

2. The articulated tow vehicle according to claim 1 wherein the length of said handle lever is great compared to the horizontal distance between said locking post and said shaft, which shaft connects the wheels of said jack housing, so as to maximize the moment arm about said axis.

3. The articulated tow vehicle according to claim 1 and further including shim means selectively mounted on said jack platform for adjusting the height of said locking post with respect to said aperture and said tongue.

4. The articulated tow vehicle as claimed in claim 1, said upwardly extending handle lever having switch means thereon for actuating said drive motor and to reverse direction of said motor for displacement of said jack platform and power pack platform.

* * * * *